3,396,173
SYNTHESIS OF EPISULFIDES
Ronald C. Vander Linden and Juan M. Salva, Sarnia, Ontario, and Peter A. C. Smith, Petrolia, Ontario, Canada, assignors to Esso Research and Engineering Company, a corporation of Delaware
No Drawing. Filed Jan. 4, 1966, Ser. No. 518,539
7 Claims. (Cl. 260—327)

ABSTRACT OF THE DISCLOSURE

Episulfides, useful in the preparation of chemicals and polymers, are prepared by the vapor phase catalytic conversion of epoxides in the presence of carbon disulfide or carbonyl sulfide over alkali metal carbonates or hydroxides supported by alkaline earth metal carbonates.

---

The present invention relates to an improved process for the economic synthesis of episulfides by reacting saturated or unsaturated epoxides, in the vapor phase, with COS or $CS_2$. More particularly, this invention relates to obtaining high initial selectivities, e.g. up to 90%, along with good conversion, e.g. up to 60%, specifically by reacting the epoxide with COS or $CS_2$ in the presence of an alkali metal carbonate or hydroxide on alkaline earth metal carbonate or in the presence of an alkaline earth metal carbonate when COS is utilized as the sulfur-containing compound. Most particularly, in a preferred embodiment the invention relates to carrying out the reaction at temperatures of 30–400° C. in the presence of the following solid catalysts: alkali metal carbonates or hydroxides on alkaline earth metal carbonates, e.g. $K_2CO_3$ on $CaCO_3$, $Na_2CO_3$ on $BaCO_3$, KOH on $CaCO_3$, or, when COS is the sulfur-containing compound, the catalyst is an alkaline earth metal carbonate, e.g. $CaCO_3$, $SrCO_3$, $BaCO_3$.

Highly reactive olefin episulfides of the type of ethylene episulfide and propylene episulfide are clearly recognized to be potentially valuable chemical monomers useful for the preparation of various polymers and a variety of other uses. However, volume use of these materials has to the present awaited an economic method for their synthesis. Such an economic synthesis is provided by the present process.

The catalysts of the present invention are preferably in a granular or pelletized form and may be prepared in any suitable manner. For example, calcium carbonate may be ball milled to any desired mesh size or compressed from a powder to desirable pellet sizes. An alkali metal carbonate, e.g. potassium carbonate on calcium carbonate may be prepared also by ball milling and/or pelletizing or by preparing a slurry of calcium carbonate and water to which the proper amount of $K_2CO_3$ is added, drying to obtain a powder, compressing the powder, and meshing to the desired size. The catalysts are normally anhydrous.

Suitable feed stocks for use in the present invention are unsaturated organic epoxide feeds, preferably gaseous feeds or feeds capable of being converted to a gas without decomposition as follows:

(a) $C_2$ to $C_{12}$, preferably $C_2$ to $C_9$ branched and straight chain monoolefin epoxides including epoxides containing other functional groups such as aryl groups, carboxyl groups, chlorine, fluorine, etc., e.g. epoxides of the following: ethylene, propylene, isobutylene, 1-butene, 2-butene, 2-methyl-1-butene, pentenes, hexenes, heptenes, dodecenes, styrene, oleic acid, etc.

(b) Same range for epoxides of cyclic monoolefins and substituted cyclic monoolefins, and alkyl, aryl, carboxyl, chlorine and fluorine substituted cyclic monoolefins, beginning with the $C_3$ ring, e.g. epoxides of cyclobutene, cyclopentene, cyclohexene, cycloheptene, cyclooctene, alkyl substituted derivatives thereof, cyclopentenecarboxylic acid, cyclohexenecarboxylic acid, cinnamic acid, etc.

(c) Same range for branched and straight chain unconjugated diolefin epoxides and alkyl, aryl, carboxyl, chlorine and fluorine substituted unconjugated diolefin epoxides beginning with $C_3$(allene), e.g. epoxides of 1-4 pentadiene, 1-5 hexadiene, etc.

(d) Same range for conjugated diolefin epoxides, branched and straight chain, and alkyl, aryl, carboxyl, chlorine and fluorine substituted conjugated diolefin epoxides beginning with $C_4$, e.g. epoxides of 1-3 butadiene, isoprene, chloroprene, etc.

(e) Same range for conjugated and unconjugated cyclic diolefin epoxides and alkyl, aryl, carboxyl, chlorine and fluorine substituted cyclic diolefin epoxides beginning with the $C_4$ ring, e.g. epoxides of cyclobutadienes, cyclopentadienes, cyclohexadienes, cyclohexadienecarboxylic acids, cycloheptadienes and cyclooctadienes.

(f) Same range for noncyclic and cyclic triolefin epoxides and substituted triolefin epoxides including as substituents alkyl groups, aryl groups, carboxyl groups, chlorine, fluorine, etc., beginning with $C_6$, e.g. epoxides of cycloheptatrienes, cyclooctatrienes, 1,3,5-hexatriene, heptatrienes, etc.

(g) Same range for epoxides of other nonhydrocarbon feeds including fatty acids, furan, thiophene, 1,4-pyrone, alkyl- and aryl-substituted thiophenes, unsaturated alcohols, e.g. epoxides of allyl alcohol, etc.

The present invention may be carried out under the following preferred conditions:

(1) Temperatures in the range of 0 to 500° C., preferably 30–400° C., more preferably 100–250° C., still more preferably 100–200° C., e.g. 150° C.

(2) Pressures in the range of 0.1 to 50 atmospheres, preferably 1 to 5 atmospheres, e.g. 1 atmosphere.

(3) Mole ratios of COS or $CS_2$ to epoxide in the range of 1/10 to 1000/1, preferably 0.5/1 to 100/1, more preferably 1/1 to 10/1, e.g. 2/1.

(4) Reaction times in the range of 0.1 second to 1 hour, preferably 0.1 minute to 0.25 hour, more preferably 10 seconds to 5 minutes.

(5) Throughputs of 0.05 to 1.5 liquid hourly space velocity, preferably 0.5 to 1.0 LHSV, e.g. 0.83 LHSV.

(6) Weight concentrations of alkali metal carbonate or hydroxide on alkaline earth metal carbonate from 0.1–10.0 wt. percent, preferably 0.1–1.0 wt. percent, and particularly preferred 0.1–0.25 wt. percent.

In a preferred embodiment, the reaction is carried out in a flow reactor having an L/D of 3:1 to 25:1 at reaction times of 5 seconds to 10 minutes. Also, in a preferred embodiment conditions are utilized to obtain high conversions per pass of 50% to 95% and the desired products, e.g. episulfides are removed from the reactor product gases by absorption, extraction, etc. The remaining reaction products are recycled to extinction to thereby obtain high overall yields and conversions.

The present invention will be more clearly understood from a consideration of the following examples.

All of the following examples were conducted in a Pyrex glass reactor (12½ inches long by 1 inch ID) contained in a furnace. Propylene oxide and carbonyl sulfide/carbon disulfide were separately introduced, through rotameters, into the reactor. The laboratory equipment was valved so as to permit mass chromatographic sampling of the entering gases and product gases from the reactor.

Conversion is reported as percent of oxide reacted/oxide feed.

Episulfide selectivity is reported as percent of sulfide formed/oxide reacted.

Yield is reported as the mole percent of episulfide formed/oxide feed.

All catalysts utilized were Fisher Certified Reagent grade materials obtained from the Fisher Scientific Company.

Example 1.—Reaction of epoxide with COS or $CS_2$ over $K_2CO_3$ on $CaCO_3$

The following table illustrates the ability of a 0.25 wt. percent $K_2CO_3$ on $CaCO_3$ catalyst to promote the reactions of propylene oxide and carbonyl sulfide or propylene oxide and carbon disulfide to synthesize episulfides. (The catalyst was prepared by adding the proper amount of $K_2CO_3$ to a water slurry of $CaCO_3$; drying the mixture at 125–140° C. under a nitrogen purge to produce a powder, mixing in a Waring Blendor for 10 minutes, compressing the powder into pellets, and meshing to a 4–16 mesh size.)

| Reactants | Mole Ratio | Temp., ° C. | GHSV or LHSV a | Conversion, Percent | Selectivity, Percent | Episulfide Yield, Percent |
|---|---|---|---|---|---|---|
| COS/$C_3O$ | 2/1 | 150 | 300 GHSV | b 49 | 47 | 23 |
| $CS_2$/$C_3O$ | 2/1 | 200 | 0.83 LHSV | c 22 | 76 | 17 | a GHSV and LHSV are Gaseous (Reaction Temperature) hourly space velocity v./v./hr. and Liquid hourly space velocity v./v./hr., respectively.
b Sampling after 60 minutes.
c Sampling after 82 minutes.

These results indicate that 0.25 wt. percent $K_2CO_3$ supported on $CaCO_3$ is a good catalyst for episulfide synthesis.

Example 2.—Life test of $K_2CO_3$ on $CaCO_3$ for reactions of COS or $CS_2$ with epoxide The experiments of Example 1 were continued after the initial sampling times shown. After six hours the reaction between carbonyl sulfide and propylene oxide resulted in a 5% yield of episulfide. The following table shows the results of continuing the reaction between propylene oxide and carbon disulfide:

| Sampling Period, min. | Conversion, percent | Selectivity, percent | Yield, percent |
|---|---|---|---|
| 82–142 | 22 | 76 | 17 |
| 562–622 | 8 | 90 | 7 |
| 699–759 | 5 | 86 | 5 |

These results indicate that catalyst deactivates as the reaction continues. Polymer formation was visually observed on the used catalyst.

Example 3.—Reaction of $CS_2$ with epoxide over various $K_2CO_3$ concentrations on $CaCO_3$ $CS_2$ and propylene oxide were reacted over various weight percents $K_2CO_3$ supported on $CaCO_3$. The results are shown in the following table:

| Mole Ratio $CS_2$/$C_3O$ | Temp., ° C. | Catalyst | Conversion, Percent | Selectivity, Percent | Yield, Percent |
|---|---|---|---|---|---|
| 2/1 | 200 | 1% $K_2CO_3$ on $CaCO_3$ | 29 | 66 | 20 |
| 2/1 | 200 | 0.5% $K_2CO_3$ on $CaCO_3$ | 60 | 37 | 22 |
| 1/1 | 200 | 5% $K_2CO_3$ on $CaCO_3$¹ | 26 | 50 | 13 |

¹ $CaCO_3$ contained 5–10 wt. percent asbestos meal as an inert binder.

These results indicate that the weight percent $K_2CO_3$ used on the support is not critical and may vary widely. However, the lower percentages are preferred.

Example 4.—Reaction of COS or $CS_2$ with epoxide over $K_2CO_3$ on stainless steel Carbonyl sulfide and propylene oxide, in a mole ratio of 1/1, were reacted at 170° C. and atmospheric pressure with a gaseous hourly space velocity of 300, and a catalyst of 1–2% $K_2CO_3$ on stainless steel. (Catalyst produced by soaking stainless steel in a slurry of $K_2CO_3$ and drying. The episulfide yield was 2%, but there was no measurable propylene oxide conversion.

A similar experiment, conducted under the same reaction conditions and with $K_2CO_3$ on stainless steel saddles, resulted in a 1% episulfide yield when carbon disulfide was used as the sulfur-containing material. Thus, comparing this result with the result of Example 5, $K_2CO_3$ does not catalyze the reaction to any appreciable extent. However, $K_2CO_3$ on $CaCO_3$ is a good catalyst, indicating that the combination of the two carbonates is essential.

Example 5.—Reaction of COS with epoxide over stainless steel

Carbonyl sulfide and propylene oxide in a molar ratio of 2/1 were reacted at 150° C. and atmospheric pressure with a gaseous hourly space velocity of 270 over stainless steel. After a 1 hour running time the yield of episulfide was 0% and 100% of the charge was recovered. This example illustrates that stainless steel will not catalyze episulfide or other reactions and that it is the positive effect of the $CaCO_3$ and not a negative effect of stainless steel which causes the difference between Examples 3 and 4.

Example 6.—Reactions of COS or $CS_2$ with epoxide over $CaCO_3$

Propylene oxide was independently reacted with carbonyl sulfide and carbon disulfide over a catalyst of $CaCO_3$ alone. The results are shown in the following table:

| Reactants | Mole Ratio | GHSV | Temp., ° C. | Conversion, Percent | Selectivity, Percent | Yield, Percent |
|---|---|---|---|---|---|---|
| COS/$C_3O$ | 2/1 | 270 | 150 | ¹ 26 / ² 36 | 85 / 90 | 30 / 40 |
| $CS_2$/$C_3O$ | 2/1 | 200/400 | 200/250 | — | (³) | 0 |

¹ After 3 hours running time catalyst was clean—no visible polymer formation.
² After 10 hrs. running time cayalyst was clean—no visible polymer formation.
³ Result was 100% recovery of charge.

These results show that alkaline earth metal carbonates will only catalyze a reaction involving COS, but alkali metal carbonates in combination with alkaline earth metal carbonates will catalyze reactions involving $CS_2$ or COS. The data presented show that various temperatures and space velocities were investigated for the reaction with $CS_2$ to determine critical conditions. However, no episulfide was formed.

Example 7

To further illustrate that carbon disulfide cannot be used with alkaline earth metal carbonates, the following table shows negligible episulfide yields for the reaction of carbon disulfide with propylene oxide over other alkaline earth metal carbonates:

shown below indicate an excellent episulfide selectivity over this catalyst.

| Mole Ratio $CS_2/C_3O$ | Catalyst | Temp., °C. | Throughput, v./v./hr. | Conversion, Percent | Selectivity, Percent | Yield, Percent |
|---|---|---|---|---|---|---|
| 1/1 | $BaCO_3$ | 250/280 | 0.11 | 9.4 | 18 | 1.6 |
| 1/1 | $SrCO_3$ | 250/280 | 0.10 | 7 | 14 | 1.0 |

Example 8.—Reaction of COS with epoxide over various alkaline earth metal carbonates With conditions similar to those employed in Example 7 COS is reacted with propylene oxide over a $BaCO_3$ catalyst. Good episulfide yields are obtained. A similar result is obtained when using an $SrCO_3$ catalyst. Indications are that alkaline earth metal carbonates will catalyze an episulfide reaction with COS.

Example 9.—Effective of LHSV on reaction of $CS_2$ with epoxide over $K_2CO_3$ on $CACO_3$ The following table illustrates the effect of liquid hourly space velocity on episulfide yield for the reaction of carbon disulfide and propylene oxide over a 1% $K_2CO_3$ on $CaCO_3$ catalyst. Reaction conditions were 200° C. at atmospheric pressure and a molar ratio of $CS_2/C_3O$ of 1/1.

| LHSV | Sampling Time, hr. | Conversion, percent | Selectivity, percent | Yield, percent |
|---|---|---|---|---|
| 0.5 | 3d | 42 | 36 | 15 |
| 0.83 | 2d | 29 | 66 | [1] 19 |
| 1.0 | 2d | 7 | 82 | 6 |

[1] Polymer formation was visually observed on the catalyst after this run.

Example 10.—Reaction of COS with ethylene oxide over $CaCO_3$

Carbonyl sulfide and ethylene oxide in a molar ratio of 2/1 were reacted at 150° C. and atmospheric pressure, with a liquid hourly space velocity of 0.5, over a $CaCO_3$ catalyst. The run was continued for 10 hours. The conversion of ethylene oxide ranged from 30–40% and the yield of ethylene episulfide ranged from 26–36% over the duration of the run. A small amount of polymer formation was visually observed on the catalyst after the run.

A similar test was conducted with 0.16 in. by 0.16 in. stainless steel saddles as catalyst. No ethylene episulfide was found in the reactor effluent.

Example 11.—Reaction of $CS_2$ with propylene oxide over KOH on $CaCO_3$

A life test of the solid catalyst, 0.25 wt. percent KOH on $CaCO_3$, 8–16 mesh size, was conducted. Carbon disulfide and propylene oxide, in a mole ratio of 2/1, were reacted at a temperature of 200° C. under atmospheric pressure, with a throughput of 0.83 LHSV. The results

| Sampling Period, min. | Conversion, percent | Selectivity, percent | Yield, percent |
|---|---|---|---|
| 86–146 | 8 | 100 | 8 |
| 386–446 | 11 | 93 | 11 |

Although conversion for this catalyst was relatively low, the excellent selectivity to episulfide resulted in appreciable episulfide yields.

What is claimed is:
1. A process for the synthesis of episulfides which comprises reacting in the vapor phase an epoxide with a sulfur compound selected from the group consisting of COS and $CS_2$ in the presence of a solid catalyst selected from the group consisting of alkali metal carbonates and hydroxides on alkaline earth metal carbonates and alkaline earth metal carbonates, provided that when COS is the sulfur compound the catalyst is an alkaline earth metal carbonate.

2. A process for the synthesis of episulfides which comprises reacting in the vapor phase an epoxide with a sulfur compound selected from the group consisting of COS and $CS_2$ in the presence of a solid catalyst selected from the group consisting of alkali metal carbonates on alkaline earth metal carbonates and alkali metal hydroxides on alkaline earth metal carbonates, and the reaction temperature is 30–400° C.

3. The process of claim 2 in which the concentration of alkali metal carbonate or alkali metal hydroxide on alkaline earth metal carbonate is about 0.1–10 wt. percent.

4. The process of claim 2 in which the catalyst is $K_2CO_3$ on $CaCO_3$.

5. The process of claim 2 in which the catalyst is KOH on $CaCO_3$.

6. A process for the synthesis of episulfides which comprises reacting in the vapor phase an epoxide with COS in the presence of a solid alkaline earth metal carbonate catalyst, and the reaction temperature is 30–400° C.

7. The process of claim 6 in which the catalyst is $CaCO_3$.

References Cited
UNITED STATES PATENTS

| | | | |
|---|---|---|---|
| 2,193,415 | 3/1940 | Coltof | 260—327 |
| 2,828,318 | 3/1958 | Reynolds | 260—327 |
| 3,213,108 | 10/1965 | Osborn et al. | 260—327 |
| 3,282,960 | 11/1966 | Broderick et al. | 260—327 |

JAMES A. PATTEN, *Primary Examiner.*